United States Patent Office 2,868,754
Patented Jan. 13, 1959

2,868,754

STABLE LATEX COMPOSITION COMPRISING CARBOXYL - CONTAINING ELASTOMER AND ALKALI/METAL/ALUMINATE OR THE LIKE AS WATER-SOLUBLE CURING AGENT

Gorman E. Eilbeck, Elyria, and Elmer R. Urig, Lorain, Ohio, assignors to The B. F. Goodrich Company, New York, N. Y., a corporation of New York No Drawing. Application June 29, 1955
Serial No. 518,956

5 Claims. (Cl. 260—29.7)

This invention relates to latex compositions of carboxyl-containing elastomers with a water-soluble curing agent therefor and relates more particularly to latices containing elastomeric polymeric materials comprising predominantly linear carbon chains to which are attached carboxyl groups and a water-soluble aluminate as a curing agent therefor.

A major problem in the compounding and commercial utilization of elastomer latices is the incorporation into the latex of the necessary compounding ingredients, particularly a curing agent, without obtaining latices of poor stability or in some cases coagulation of the dispersed polymer; and at the same time obtaining an intimate and uniform integration of the compounding ingredients in the latex. It has been necessary heretofore to prepare the curing agents and other pigments, to be incorporated in the latex by suspension in finely ground water dispersions. The addition of these dispersions to a latex usually upsets the critical balance of surface-active agents and/or protective colloid on the polymer particles with resultant latex instability. Another and more important problem is involved when compounded latices are employed to impregnate paper and textile products which have closely knit fibers, in which case there is a tendency to strain-out the compounding ingredients from the latex either by physical barriers or by adsorption so that one obtains an impregnated article with an uneven distribution of compounding ingredients which results, when these articles are cured or vulcanized, in uneven, and in many areas, complete lack of cure in the polymer product. These problems are faced by those who attempt to use latices of carboxyl-containing elastomers wherein the curing agent is a polyvalent metal oxide such as zinc oxide. Large amounts of zinc oxide are required in such latex systems to obtain an effective cure of the polymer.

It is accordingly one of the objects of this invention to provide a stable latex system of carboxyl-containing elastomers and curing agents. It is another object of the invention to provide a latex composition of carboxyl-containing elastomers and an efficient water-soluble curing agent, which agent does not require dispersions formulations in order to introduce the agent into the latex. It is a still further object of the invention to provide a latex composition of carboxyl-containing elastomers and a curing agent intimately mixed in the latex which is not filtered out or which does not deposit on fibers when a latex composition containing the curing agent is used to impregnate fibrous materials such as paper and textiles. Another object of the invention is to provide a latex composition of carboxyl-containing elastomers and a curing agent in small amounts which will form continuous films which will cure in relatively short periods of time at room temperature so as to have excellent physical properties.

The objects of this invention are accomplished by providing a latex dispersion containing a plastic rubbery polymeric material comprising predominantly linear carbon chains to which are attached carboxyl groups and a small amount of a water-soluble aluminate such as sodium or potassium aluminate. By means of this invention one is able to obtain stable latex compositions containing a non-staining, non-discoloring, water-soluble curing agent which is not deposited on fibers when such materials as paper and textiles are impregnated with said composition. The films deposited from the latex compositions of the invention will cure at room temperature in a reasonable time, or in less than 10 minutes at 180° F. to 230° F. to form elastomers of excellent physical properties. Quite unexpectedly, polymer films obtained from the latex compositions of this invention are relatively water-insensitive.

The rubbery polymeric material of the latex comprise predominantly linear carbon chains to which are attached carboxyl groups and are preferably the plastic polymers of an open chain aliphatic conjugated diene containing a controlled amount and distribution of combined carboxyl (—COOH) groups. For example, as is disclosed in a copending application of Harold P. Brown, Serial No. 193,521, filed November 1, 1950, now United States Patent 2,724,707, such latices may be prepared by polymerizing in an acidic aqueous medium a monomeric mixture comprising (preferably at least 50% by weight) an open chain aliphatic conjugated diene and an olefinically unsaturated carboxylic acid.

The open-chain, aliphatic conjugated diene may be any of the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3 and other hydrocarbon homologs of butadiene-1,3, or it may be any of the straight-chain conjugated pentadienes or the straight- and branch-chain conjugated hexadienes and others. The butadiene-1,3 hydrocarbons and butadiene-1,3 in particular, because of ability to produce stronger and more desirable elastomeric polymers are much preferred.

Any olefinically-unsaturated carboxylic acid which polymerizes with a diene to produce rubbery carboxyl-containing polymers and which is characterized by possessing one or more olefinic carbon-to-carbon double bonds and one or more carboxyl (—COOH) groups may be utilized. That is, there may be utilized monocarboxy and polycarboxy, monoolefinic and polyolefinic acids including, for example, such widely divergent materials as acrylic acid, the alpha-alkyl acrylic acids, crotonic acid, beta-acryloxy propionic acid, alpha- and beta-vinyl acrylic acids, alpha-beta-isopropylidene propionic acid, sorbic acid, cinnamic acid, maleic acid, and others.

It is preferred to utilize, as the olefinically-unsaturated acid polymerized with the diene, one or more olefinically-unsaturated carboxylic acids containing at least one activated olefinic carbon-to-carbon double bond, that is, an acid containing an olefinic double bond which readily functions in an addition polymerization reaction because of the double bond being present in the monomer molecule either in the alpha-beta position with respect to the strongly polar carboxyl group thusly

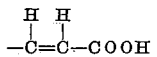

or attached to a strongly reactive terminal methylene grouping thusly $CH_2=C<$.

Illustrative alpha-beta unsaturated carboxylic acids within the just-described preferred class are crotonic acid, alpha-butyl crotonic acid, angelic acid, hydrosorbic acid, cinnamic acid, m-chlorocinnamic acid, p-chlorocinnamic acid, umbellic acid, beta-methyl hydrosorbic acid, and other monoolefinic monocarboyxlic acids; sorbic acid, alpha-methyl sorbic acid, alpha-ethyl sorbic acid, alpha-chlorosorbic acid, alpha-bromosorbic acid, beta-chloro-sorbic acid, alpha-, beta-, gamma- or delta-dimethyl sorbic acid, alpha-methyl-gamma-benzal crotonic acid, beta-(2-butenyl) acrylic acid (2,4-heptadiene-oic-1), 2,4-pentadienotic acid, 2,4,6-octatrienoic acid, 2,4,6,8-decatetrienoic acid, 1 - carboxy - 1 - ethyl-4-phenyl butadiene-1,3 2,6-dimethyl decatriene-(2,6,8)-oic-10, alpha-beta-isopropylidene propionic acid, alpha-vinyl cinnamic acid, alpha-isopropenyl-furfuryl acetic acid, alpha-isopropenyl-cinnamenyl acrylic acid and other polyolefinic monocarboxylic acids; maleic acid, fumaric acid, hydromuconic acid, glutaconic acid and other monoolefinic polycarboxylic acids; 3-carboxy-pentadiene-(2,4)-oic-1, muconic acid, and other polyolefinic polycarboxylic acids.

Olefinically-unsaturated carboxylic acids containing the $CH_2=C<$ grouping are usually preferred and include acrylic acid, alpha-chloroacrylic acid, alpha-cyano acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy butadiene-1,3), alpha-vinyl acrylic acid, beta-acryloxy propionic acid, beta-acryloxy acetic acid, and others.

Best results are obtained by interpolymerizing with a conjugated diene a monoolefinic monocarboxylic acid in which the double bond is both in alpha-beta position with respect to the carboxyl group and is terminal methylene in structure, such as the acrylic acids including acrylic acid, methacrylic acid, alpha-chloro acrylic acid, ethacrylic acid, and the like and other acids of this structure.

The proportions of conjugated diene and acid are not critical as long as a polymer is obtained which is plastic and contains sufficient combined carboxyl as will be hereinafter defined. Particularly valuable rubber-like or elastomeric materials are the interpolymers made from monomeric mixtures containing from about 45 to 94% by weight of a butadiene-1,3 hydrocarbon such as butadiene-1,3, from about 1 to 30% by weight of an acid such as methacrylic acid, acrylic acid, sorbic acid or the like, and from about 5 to 50% by weight of acrylonitrile, the styrenes, alkyl acrylates and methacrylates and the like. This third monomer may be any of the vinylidene monomers or mixtures thereof, that is, unsaturated compounds containing the $H_2C=C<$ group, the vinylidene compounds contain a terminal methylene group attached by double bond to the carbon atom. Examples of such compounds include vinylidene compounds containing only one carbon-to-carbon unsaturated bond such as vinyl chloride; vinyl acetate; vinylidene chloride; vinyl fluoride; dichlorodifluoroethylene; vinyl acetate; the styrenes including alpha-substituted styrenes such as alpha-methyl styrene, vinyl toluene, the chlorostyrenes, alkoxystyrenes and the like; acrylonitrile, methacrylonitrile and chloroacrylonitrile; the alkyl acrylates and methacrylates; the alkyl vinyl ethers and alkyl vinyl ketones; the acrylamides; vinyl pyridine; vinyl benzoate and other similar monoolefinic compounds polymerizable with butadiene-1,3 by a free radical mechanism in aqueous systems. Other vinylidene compounds containing more than one unsaturated linkage include the other conjugated dienes and compounds containing olefinic and acetylinic bonds such as vinyl acetylene, vinyl diethenyl carbonyl and the like. It will be understood that the vinyl compounds are a species of vinylidene compounds since they contain characteristic

groups, one of the valences being connected to H to form vinyl groups.

Any other latex of plastic rubbery polymeric materials comprising predominantly linear carbon chains to which are attached carboxyl groups, regardless of whether the carboxyl groups are introduced by interpolymerization, by hydrolysis of groups in the polymer chain as described in U. S. Patent 2,710,292, by reaction of a rubbery material with a carboxylating agent as described in U. S. Patent 2,662,874, or by any other chemical reaction, are utilizable in preparing the latex compositions of this invention. Less desirable, but often useful, is the preparation of a carboxyl containing polymer whereby the carboxyl group is introduced into the diene-containing polymer chain in the solid form, which solid then is dispersed in water and the water-soluble curing agents of this invention added thereto.

It is important, however, that the plastic, synthetic rubbery materials, regardless of how produced, contain a controlled amount of combined carboxyl more or less uniformly distributed over the polymer chains. For the purposes of this invention they should contain from 0.001 to about 0.30 chemical equivalent by weight per 100 parts by weight of rubbery material (hereinafter referred to as "equivalents per hundred rubber" and abbreviated e. p. h. r.). Latices of plastic synthetic rubbery materials containing preferably from about 0.01 to 0.20 e. p. h. r. of carboxyl when treated according to this invention readily produce on drying and heating, elastic polymeric materials of a predominantly rubbery nature having a good balance of tensile strength, modulus, elongation and other excellent properties while, dispersions of rubbery materials containing from about 0.01 to 0.10 e. p. h. r. of carboxyl in the dispersed polymer produce polymeric products having excellent physical properties.

The curing agents of this invention are water-soluble alkali metal aluminates such as sodium and potassium aluminate which are identified in the older literature as $KalO_2$ and $NaAlO_2$, or $Kal(OH)_4$ and $NaAl(OH)_4$ more recently. The amount of metal salt of the amphoteric hydroxide employed in the practice of the invention may be varied depending on the carboxyl content of the diene polymer, and while amounts of sodium aluminate as little as about 0.05 part by weight per 100 weight parts of polymer will cause an observable degree of cure, the amount of sodium or potassium aluminate preferably constitutes at least an amount theoretically required to react with $\frac{1}{10}$ of the polymeric carboxyl groups and more preferably with at least $\frac{1}{2}$ of the carboxyl groups. The small amount of sodium or potassium aluminate required to obtain an efficient cure of the polymer in carboxyl containing diene elastomer latices is quite surprising and ordinarily is about $\frac{1}{10}$ of less the amount of zinc oxide required to obtain a similar state of cure of the equivalent polymer of a latex. Of course, larger amounts may be employed as desired but ordinarily an excess is not necessary above and beyond a particular desired state of cure. Commercial sodium aluminate contains some excess sodium hydroxide and some alkali is probably essential to inhibit formation of $Al(OH)_3$ but it is believed that so long as the salt is alkaline it is satisfactory.

In the practice of the invention, sodium aluminate is ordinarily dissolved in soft (deionized) water to make about a 5% to 10% solution of active sodium aluminate. A 2% solution is quite stable. Prior to adding the sodium aluminate solution to the desired latex, the latex is adjusted to a pH above 7.0 and below 12, preferably between about 8 and 11 with 1.0 normal sodium hydroxide. More preferably the latex has a pH of between about 9 and 10. The sodium aluminate solution is added to the latex with mild agitation to the desired concentration. The pH of the latex should then be between about 8.5 and 10.5. These latices are quite stable on storage.

A preferred latex composition is prepared by first polymerizing in an acidic aqueous emulsion a monomer mixture containing about 50 to 78 weight percent butadiene, 20 to 45 weight percent acrylonitrile and about 2 to 10 weight percent methacrylic or acrylic acid. To the resulting latex dispersion there is added about 0.05 to 5.0 weight part of sodium aluminate per one hundred of elastomer in a water solution, and preferably about 0.10 to 2.5 parts. When interpolymer is made with about 2.5 to 5.0 parts of methacrylic acid, optimum properties are obtained with about 0.2 to 0.5 part of sodium aluminate. Representative embodiments of the invention follow. All parts are parts by weight unless otherwise indicated.

Example I

A latex containing an interpolymer of acrylonitrile, butadiene-1,3 and methacrylic acid is prepared by suspending a mixture of these monomers in 125 parts of water containing about 3.5 parts of a synthetic-detergent which is preferably a mixture of sodium salts of an alkyl aryl sulfonic acid and an aryl alkyl sulfonic acid, about 0.1 part potassium chloride and 0.3 part of potassium persulfate; said monomer mixture consisting of 55 parts of butadiene-1,3, 42 parts of acrylonitrile and 3 parts of methacrylic acid; and about 0.4 part of a tertiary $C_{12}$ mercaptan. The polymerization is conducted with agitation at a temperature of about 40° C. to about 90% conversion of monomers to polymer, and is thereafter short-stopped with an alkylated hydroquinone and a stabilizer in amount of 2% such as a heptylated diphenylamine added thereto. The resulting latex contains about 40% total solids and should be adjusted to a pH of about 9. A portion of this latex is compounded by adding thereto an aqueous dispersion of 5 parts of butyl zimate, 5 parts of zinc salt of mercaptobenzothiazole and 9 parts of zinc oxide, prepared by milling these pigments in water in the presence of a wetting agent and small amount of bentonite clay and casein, per 100 parts of polymer. To another portion of the latex is added 0.5 part of sodium aluminate by stirring in a 5% solution. Films are cast from the two compounded latices which (1) are allowed to dry overnight and are aged at room temperature for 3 days and (2) other dry films are heated for 20 minutes in 250° F. oven and then aged for 3 days. The resulting vulcanizates have the following stress-strain properties:

|  | Tensile Strength, p. s. i. | Elongation, Percent | 300% Modulus, p. s. i. |
|---|---|---|---|
| Zinc Oxide: |  |  |  |
| 3 days—room temperature | 750 | 1,000 | 175 |
| 20 minutes at 250° F | 2,230 | 740 | 323 |
| Sodium Aluminate: |  |  |  |
| 3 days—room temperature | 1,175 | 915 | 265 |
| 20 minutes at 250° F | 3,100 | 810 | 335 |
| (Aged in constant humidity room) | 3,575 | 800 | 300 |

The superior product obtained with the water-soluble curing agent, sodium aluminate, of this invention is readily apparent from the data given above. Such compositions cure more rapidly and to a higher state of cure than do those containing zinc oxide, even with 1/18 the amount of sodium aluminate used in comparison to zinc oxide. The latices in these two cases when stored for long periods of time (two months) show additional differences. The latex containing sodium aluminate remains unchanged on storage while that of zinc oxide tends to form coagulum and the compounding ingredients tend to separate from the latex. The water resistance of dry films containing sodium aluminate are as good as those which contain zinc oxide. Further, cured dry film compositions containing (1) sodium aluminate are more resistant to solvents than the zinc oxide compositions, even the (2) zinc oxide compositions containing ultra-accelerators such as butyl zimate and the zinc salt of captax, (1) having a swell of 130–150% in trichloroethylene and (2) being swelled 150–180% in trichloroethylene. The cost of the materials necessary to prepare the zinc oxide ultra-accelerator composition is quite high and sodium aluminate may be used for about 1/80 of the cost of the aforementioned vulcanizing ingredients. When the above example is repeated with potassium aluminate similar useful results are obtained. Latices of carboxyl containing elastomers may also be prepared by the methods described in the copending application of Harold P. Brown, Serial No. 193,521 so long as the emulsifier is one which does not react with the alkali-metal aluminate. When this example is repeated with an interpolymer of butadiene-1,3 and methacrylic acid only or when styrene is used instead of acrylonitrile, similar results are obtained.

Example II

Portions of a carboxyl containing elastomer latex prepared as described in Example I from butadiene-1,3, containing about 0.03 e. p. h. r. of carboxyl are mixed with varying amounts of sodium aluminate in a 2% water solution as is set forth below. Polymer films are cast from each of the latices which are dried, heated for 30 minutes at 250° F. and allowed to age prior to testing. The following stress-strain data are obtained on the films obtained from latices containing varying amounts of sodium aluminate (based on the polymer content of the latex).

| Sodium Aluminate, Percent | Tensile Strength, p. s. i. | 300% Modulus, p. s. i. | Elongation, Percent |
|---|---|---|---|
| 0.0 | 860 | 150 | 1,610 |
| 0.05 | 1,620 | 176 | 1,180 |
| 0.25 | 1,950 | 212 | 900 |
| 0.5 | 2,420 | 250 | 820 |
| 1.0 | 2,780 | 295 | 920 |
| 2.0 | 2,540 | 320 | 890 |

It is obvious from the above data that the use of greater than about 1.0 part of sodium aluminate with this interpolymer results in little improvement in stress-strain properties of cured cast films. However, where it is of importance, films of this interpolymer containing greater than about 0.5% sodium aluminate exhibit slight whitening when extended. Further, there is some evidence that films of specified interpolymer which contain greater than about 1 part of sodium aluminate are slightly more water-sensitive than those which contain about 0.5 part of sodium aluminate. It is recognized, of course, that there are many applications where slight increases in water-sensitivity are not important so that the larger amounts of sodium aluminate may be employed if required or desired depending on the carboxyl content of the interpolymer. Similar results are obtained in experiments employing interpolymers containing sorbic acid and mixtures of methacrylic and acrylic acids at a concentration of about three and five parts. Tougher products are obtained as higher concentrations of carboxyl.

Example III

The pH of the latex to which the sodium aluminate is added and the final pH of the compounded latex is critical. When sodium aluminate solutions of a concentration of between 5% and 10% are added to the defined latex at a pH of about 7 some of the sodium aluminate agent precipitates from solution and introduces processing and storage difficulties. Little trouble is experienced along this line at pH's above about 7.5, preferably 8.5. Also, when pH's greater than about 11 are employed, polymer products of less than optimum properties are obtained and latices having a pH in this range are not desired for normal processing operations. A portion of the latex prepared in Examples I and II is divided into portions and the pH adjusted as set forth in the table given hereinbelow, and ½ part of sodium aluminate in 2% solution added thereto. Films are cast, dried, heated and aged, the following stress-strain properties obtained thereon:

| pH: | Tensile strength, p. s. i. |
|---|---|
| 7.5 | 1610 |
| 7.9 | 2765 |
| 9.0 | 2605 |
| 11.0 | 2025 |

If the latex composition is to be used at once, a latex pH of greater than 7.5 can be used but if there is to be any delay then the pH should be greater than 8, preferably greater than 8.5 for storage.

Example IV

A latex dispersion containing an interpolymer of a monomer mixture of 55 parts butadiene-1,3, 42 parts acrylonitrile and 3 parts methacrylic acid is prepared by polymerizing said monomer mixture in water in the presence of about half a part of a tertiary $C_{12}$ mercaptan, 4 parts of a sodium salt of an alkaryl sulfonate as the emulsifier, 0.3 part of ammonium persulfate and 0.2 part of potassium chloride at a temperature of 40° C. The resulting latex contains about 48% total solids and the polymer of the latex has a large rotor Mooney value of about 100. One portion of this latex is adjusted to a pH of about 8.5 with ammonia solution and 0.5 part of sodium aluminate as a 2% solution is added thereto and the latex diluted to a concentration of 15% total solids. A six mil thick adsorbent test paper composed essentially of alpha-cellulose is impregnated with this dispersion. Another portion of the latex is compounded with the dispersion of 9 parts of zinc oxide and similarly diluted to a total solids concentration of 15% and another sample of the same paper impregnated with this dispersion. The paper samples are dried for five minutes at 158° F. and then for five minutes at 250° F. to simulate production, drying and curing operations in the paper industry. The following data are obtained on these papers:

| Physical Properties | Sodium Aluminate | Zinc Oxide |
| --- | --- | --- |
| Pick-up—Percent | 62.4 | 79.0 |
| Elongation (dry) | 4.3 | 4.0 |
| Edge tear (dry), lbs | 16.4 | 14.5 |
| M. I. T. fold | 677 | 532 |
| Burst (dry), lbs./in | 38 | 3.5 |
| Tear (dry) | 8.1 | 5.5 |
| Tear (wet) | 13.3 | 9.4 |

The M. I. T. fold test is the number of cycles to break. Edge tear is determined on the Instron tester, the other tear values are Elmendorf values. These data indicate quite clearly the superior physical properties of paper obtained through use of a water-soluble curing agent in a concentration about 1/20 of that required for zinc oxide and at a percent pick-up of about 17% less than that for zinc oxide.

Useful latex compositions of rubbery interpolymers of alkyl acrylates also may be prepared by the process of this invention. Any of the alkyl esters of acrylic acid are utilizable in the preparation of carboxyl containing interpolymer latices by polymerization of monomer mixtures containing alkyl acrylates and any of the olefinically unsaturated carboxylic acids set forth hereinabove. Illustrative alkyl acrylates include methyl acrylate, ethyl acrylate, n-propyl acrylate, isopropyl acrylate, n-butyl acrylate, isobutyl acrylate, amyl acrylate, hexyl acrylate and the like. Better results are obtained by the use of monomeric mixtures comprising an alkyl acrylate containing from 1 to 4 carbon atoms in the alkyl group and olefinically unsaturated carboxylic acids containing at least one activated olefinic carbon-to-carbon double bond. The monomer mixtures preferably contain a major proportion of the alkyl acrylate and a minor proportion of the olefinically unsaturated carboxylic acid which is present in an amount in the monomer mixture so that the interpolymer product contains from 0.001 to 0.30 chemical equivalent of combined carboxyl per 100 weight parts of polymer. Preferred are latices containing polymerized monomer mixtures of 70 to 99 weight percent of an alkyl acrylate containing 1 to 4 carbon atoms in the alkyl group and from 1 to 30 weight percent of acrylic and methacrylic acid. These latices are also preferably prepared in aqueous emulsion on the acid side by proportioning techniques as are well known to those skilled in the art. The copending application of Earl J. Carlson, Serial No. 197,524, filed November 24, 1950, now United States Patent 2,726,230, discloses methods for making useful acrylate latices.

Although representative embodiments of the invention have been specifically described, it is not intended or desired that the invention be limited solely thereto since it will be apparent to those skilled in the art that modifications and variations may be made without departing from the spirit and scope of the invention as defined in the appended claims.

We claim:

1. A stable latex composition adapted to form readily vulcanized films and coatings and for impregnation of paper and textiles, said composition comprising a latex of a carboxyl-containing elastomeric polymer prepared by the polymerization in acidic aqueous emulsion of a mixture of monomeric materials containing about 45 to 94% by weight of butadiene-1,3, about 1 to 30% by weight of an olefinically unsaturated carboxylic acid containing a terminal vinylidene group, and about 5 to 50% by weight of another vinylidene monomer, said polymer containing from 0.01 to 0.20 chemical equivalent by weight of combined carboxyl groups per 100 parts by weight of polymer, which latex is adjusted to a pH of about 7.5 to 11 and to which is added, after polymerization and as a curing agent for said polymer, an alkali metal aluminate in an amount sufficient to provide from about 0.05 to 5 parts by weight of said aluminate for each 100 parts by weight of said carboxyl-containing elastomeric polymer.

2. A stable latex composition according to claim 1 further characterized in that the alkali metal aluminate is sodium aluminate.

3. A stable latex composition according to claim 1 further characterized in that the mixture of monomeric materials contains about 55% butadiene-1,3, about 42% acrylonitrile and about 3% methacrylic acid and in that the curing agent added is a water solution of sodium aluminate in an amount sufficient to provide from 0.10 to 2.0 parts of sodium aluminate for each 100 parts of carboxyl-containing elastomeric polymer.

4. A stable latex composition according to claim 1 further characterized in that the olefinically unsaturated carboxylic acid is selected from the class consisting of acrylic acid and methacrylic acid.

5. A stable latex composition according to claim 4 further characterized in that the vinylidene monomer is acrylonitrile.

References Cited in the file of this patent

UNITED STATES PATENTS

| | | |
| --- | --- | --- |
| 2,416,461 | Stewart | Feb. 25, 1947 |
| 2,451,180 | Stewart | Oct. 12, 1948 |
| 2,483,959 | Baer | Oct. 4, 1949 |
| 2,604,668 | Miller et al. | June 29, 1952 |
| 2,710,292 | Brown | June 7, 1955 |